Patented Aug. 18, 1925.

1,549,901

UNITED STATES PATENT OFFICE.

GÉRALD BONHÔTE, OF BASEL, SWITZERLAND, ASSIGNOR TO SOCIETY OF CHEMICAL INDUSTRY IN BASLE, OF BASEL, SWITZERLAND.

TRIAZINE AZO DYESTUFFS.

No Drawing.    Application filed March 28, 1925. Serial No. 19,169.

*To all whom it may concern:*

Be it known that I, GÉRALD BONHÔTE, citizen of the Swiss Confederation, residing at Basel, Switzerland, have invented a new and useful Improvement in Triazine Azo Dyestuffs, of which the following is a full, clear, and exact specification.

This invention relates to new dyestuffs especially adapted for the production of fast shades on the fibre. It comprises the new dyestuffs, the process of making same, their application and the material dyed with the new dyestuffs.

It has been found that the 2.4.6-derivatives of the 1.3.5-triazine corresponding with the general formula:

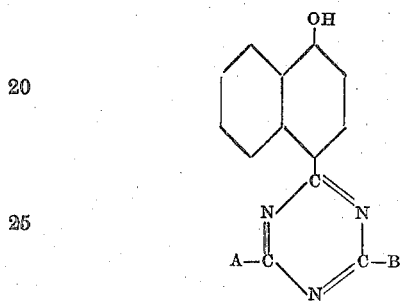

wherein A and B stand for any organic or inorganic residues, yield, when treated with unsulfonated diazo compounds, new azodyestuffs which form dark powders, insoluble in water, dissolving in sulfuric acid to solutions with bluish-red to violet-blue colorations, in alcohol to orange-red to brown-red, in glacial acetic acid to more or less violet-red solutions. The new dyestuffs may be employed for the manufacture of lakes but they are especially valuable for the production of fast tints on the fibre. Owing to a certain affinity of the above mentioned derivatives of the 1.3.5-triazine for cotton the material prepared with these products need not be dried before treating it with these diazo compounds. The shades obtained vary from yellowish-red to blue and black; they are fast to washing and may be fast to light and chlorine.

Example 1.

The yarn after having been well boiled and dried, is impregnated with a solution containing 20 gr. of 2.4.6-tri-para-hydroxy-naphthyl-1.3.5-triazine, 15 cc. of caustic soda solution of 30% strength and 20 cc. of Turkey red oil per liter. The material is thoroughly wrung out and immediately passed through a bath of diazotized 4-chloro-2-aminobenzol-1-phenylether, neutralized with sodium acetate. The yarn is thus dyed full fast Bordeaux tints.

The new dyestuff corresponds most probably with the following formula:

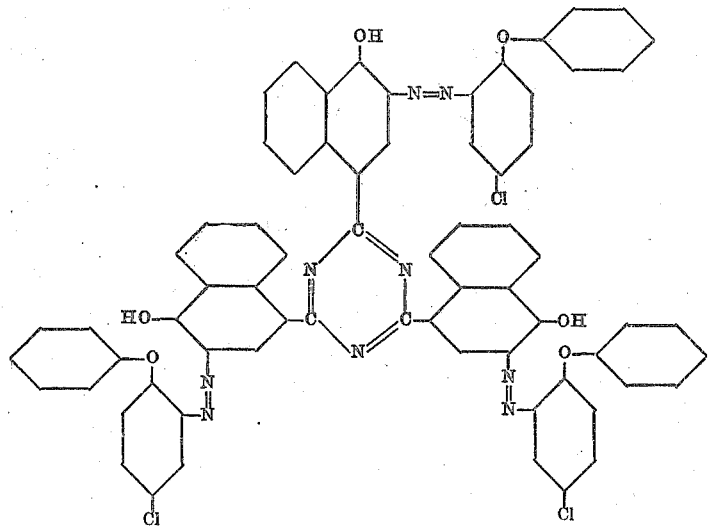

The dyestuff prepared in substance forms a dark powder, dissolving in concentrated sulfuric acid to a violet-blue, in alcohol to a brownish-red, in glacial acetic acid to a red solution. The black dyestuff obtained with 4-amino-2'-methoxyphenylazonaphthalene (cf. table) dissolves in concentrated sulfuric acid with violet-blue, in alcohol with brownish-orange and in glacial acetic acid with red coloration.

The new dyestuff corresponds most probably with the following formula:

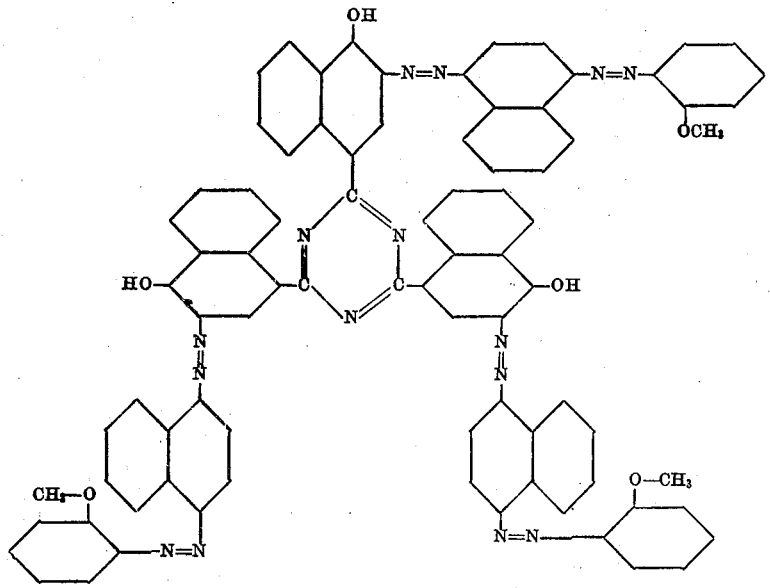

Example 2.

Cotton is prepared with an alkaline solution containing 20 gr. of 2.4-di-para-hydroxynaphthyl-6-β-hydroxynaphthyl-1.3.5-triazine and then passed through a bath of 4.4'-tetrazo-3-methoxy-6-methyl-azobenzene neutralized with sodium acetate. The cotton is thus dyed full black tints.

The dyestuff prepared in substance forms a black powder, dissolving in concentrated sulfuric acid with violet-blue in alcohol with red and in glacial acetic acid with bluish-red coloration.

The exact formula of the new dyestuff is not known but it contains most probably the atomic grouping:

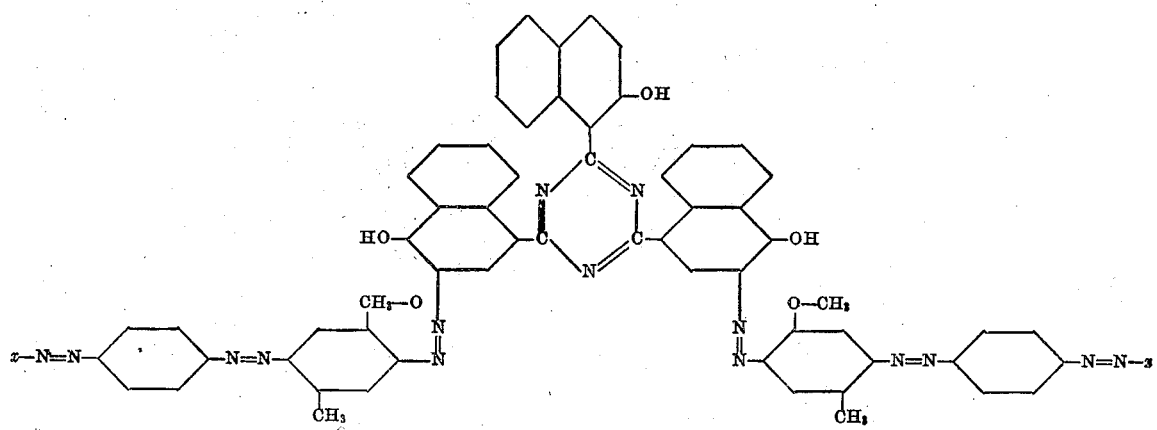

wherein $x$ stands for further complexes containing the 2.4-di-para-hydroxynaphthyl-6-β-hydroxynaphthyl-1.3.5-triazine residue.

Example 3.

Cotton is prepared with an alkaline solution containing 20 gr. of 2.4-diamino-6-para-hydroxynaphthyl-1.3.5-triazine and passed through a bath of diazotized 4-chloro-2-aminobenzol-1-benzylether. The cotton is thus dyed full bluish-red tints.

The dyestuff prepared in substance forms a dark powder, dissolving in concentrated sulfuric acid with bluish-red, in alcohol and glacial acetic acid with red colorations. The dyestuff in which the two amino residues of the triazine nucleus have been substituted by two phenylamino residues has analogous properties. The dyestuff obtained by uniting 4-chloro-o-anisidine with 2.4-di-parahydroxynaphthyl-6-phenylamino-1.3.5-triazine dissolves in concentrated sulfuric acid and in glacial acetic acid with bluish-red, in alcohol with orange-red coloration.

The following table gives a certain number of tints obtained according to the present invention.

| 1.3.5-triazine derivative. | Diazotization component. | Shade on cotton. |
|---|---|---|
| 2.4.6-tri-p-hydroxynaphtha- lene-1.3.5-triazine. | Aniline | Red. |
| Do | 4-chloroanisidine | Bordeaux. |
| Do | Aminoazobenzene | Do. |
| Do | Aminoazotoluene | Dark violet. |
| Do | 4-amino-1-phenyl- azonaphthalene. | Dark marine- blue. |
| Do | 2-ethoxy-2'.5'-di- methoxy-4'- aminoazoben- zene. | Greenish marine- blue. |
| Do | 4-amino-2'ethoxy- phenylazonaph- thalene. | Black. |
| Do | 4.4'-diamino-2- methyl-5-meth- oxyazobenzene. | Black. |
| 2.4-di-p-hydroxynaph- thalene-6-β-hydroxy- naphthalene-1.3.5-tri- azine. | 4-chloro-2-ami- nobenzol-1- phenylether. | Bordeaux. |
| 2.4-di-p-hydroxynaph- thalene-6-resorcyl-1.3.- 5-triazine. | 4-nitro-o-toluidine | Yellowish-red |
| 2.4-di-p-hydroxynaph- thalene-6-p-cresyl-1.3.- 5-triazine. | 4-chloro-2-anisidine. | Bordeaux. |
| 2.4-di-p-hydroxynaph- thalene-6-xylyl-1.3.5- triazine. | do | Do. |
| 2.4-di-p-hydroxynaph- thalene-6-β-methoxy- naphthalene-1.3.5-tri- azine. | 4-chloro-2-ami- nobenzol-1- phenylether. | Brownish-red |
| 2.4-di-p-hydroxynaph- thalene-6-anthracene- 1.3.5-triazine. | 5-nitro-o-anisidine | Bordeaux. |
| 2.4-di-p-hydroxynaph- thalene-6-phenylam- ino-1.3.5-triazine. | 4-chloroanisidine | Red. |
| 2.4-di-p-hydroxynaph- thalene-6-(2.5-dichloro)- phenylamino-1.3.5-triazine. | 3-nitro-4-toluidine | Bordeaux. |
| 2.4-di-p-hydroxynaph- thalene-6-(4-chloro)- phenylamino-1.3.5-tri- azine. | o-phenetidine | Pronounced blu- ish-red. |
| 2.4-di-p-hydroxynaph- thalene-6-p-tolyla- mino-1.3.5-triazine. | 4-chloro-2-ami- nobenzol-1- phenylether. | Red. |
| 2.4-di-p-hydroxynaph- thalene-6-o-tolylam- ino-1.3.5-triazine. | o-phenetidine | Bluish-red. |
| 2.4-di-p-hydroxynaph- thalene-6-(3-nitro)- phenylamino-1.3.5-triazine | do | Do. |
| 2.4-di-p-hydroxynaph- thalene-6-amino-1.3.5-tria- zine. | 4.4'-dichloro-2- aminobenzol- 1-phenylether. | Yellowish-red. |
| 2.4-di-p-hydroxynaph- thalene-6-chloro-1.3.5- triazine. | 4-chloroanisidine | Bordeaux. |
| 2-p-hydroxynaphtha- lene-4-amino-6-diethylam- ino-1.3.5-triazine. | do | Bluish-red. |
| 2-p-hydroxynaphtha- lene-4.6-diphenylamino- 1.3.5-triazine. | 4-chloro-2-ami- nobenzol-1-ben- zylether. | Pink. |
| 2-p-hydroxynaphtha- lene-4-amino-6-phenylam- ino-1.3.5-triazine. | p-nitraniline | Bordeaux. |
| 2-p-hydroxynaphtha- lene-4.6-dichloro-1.3.5- triazine. | 4-amino-1-phe- nylazonaph thalene. | Violet-black |

The third dyestuff of the table corresponds most probably with the formula:

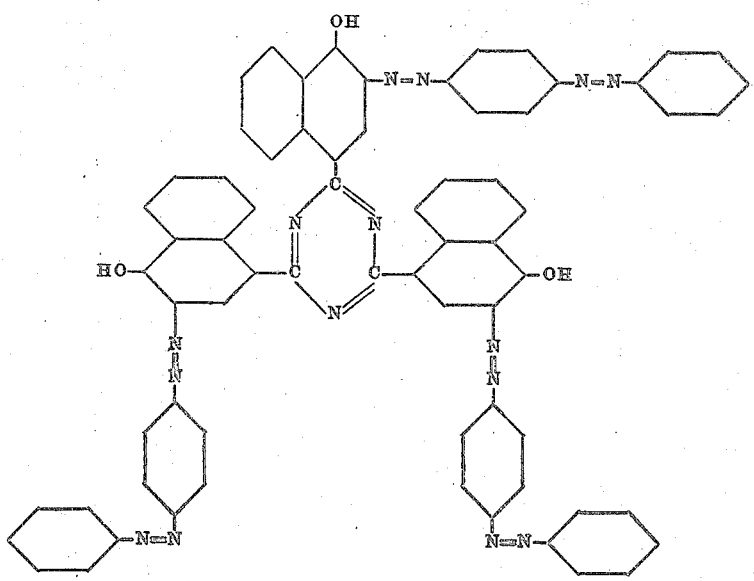

and the last most probably with the formula:

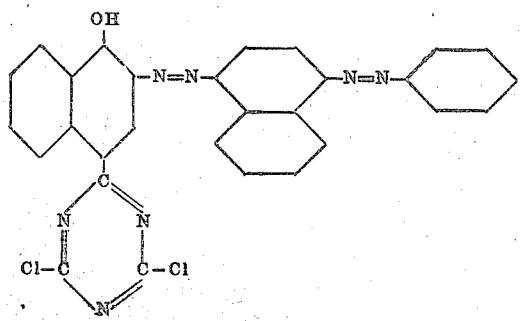

What I claim is:

1. The herein described process for the manufacture of new dyestuffs by treating 2.4.6-derivatives of the 1.3.5-triazine corresponding with the general formula

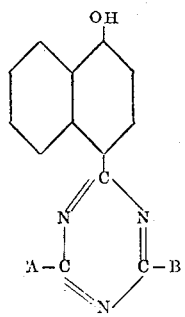

wherein A and B stand for any inorganic or organic residues with unsulfonated diazo compounds.

2. The herein described process for the manufacture of new dyestuffs by treating 2.4.6-derivatives of the 1.3.5-triazine corresponding with the general formula

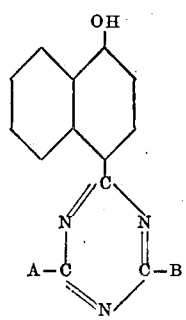

wherein A and B stand for any inorganic or organic residues with unsulfonated diazo compounds on the fibre.

3. The herein described process for the manufacture of new dyestuffs by treating 2.4.6-derivatives of the 1.3.5-triazine corresponding with the general formula

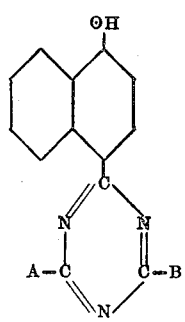

wherein A and B stand for organic residues with unsulfonated diazo compounds.

4. The herein described process for the manufacture of new dyestuffs by treating 2.4.6-derivatives of the 1.3.5-triazine corresponding with the general formula

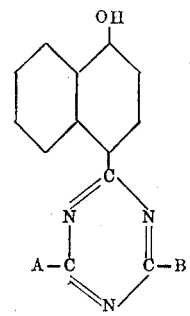

wherein A and B stand for organic residues with unsulfonated diazo compounds on the fibre.

5. The herein described process for the manufacture of new dyestuffs by treating 2.4.6-derivatives of the 1.3.5-triazine corresponding with the general formula

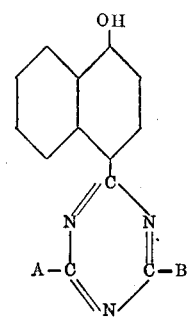

wherein A and B stand for aromatic residues with unsulfonated diazo compounds.

6. The herein described process for the manufacture of new dyestuffs by treating 2.4.6-derivatives of the 1.3.5-triazine corresponding with the general formula

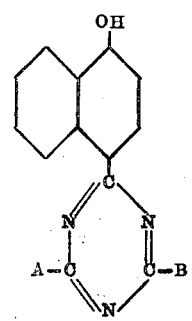

wherein A and B stand for aromatic residues with unsulfonated diazo compounds on the fibre.

7. The herein described process for the manufacture of new dyestuffs by treating 2.4.6-derivatives of the 1.3.5-triazine corresponding with the general formula

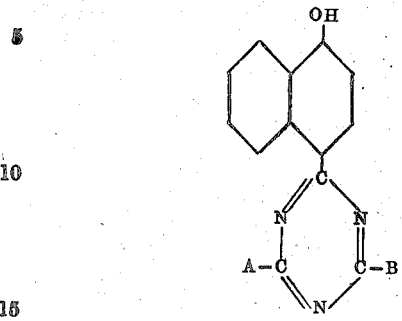

wherein A and B stand for aromatic residues of which one at the most is a 4-hydroxynaphthyl residue with unsolfonated diazo compounds.

8. The herein described process for the manufacture of new dyestuffs by treating 2.4.6-derivatives of the 1.3.5-triazine corresponding with the general formula

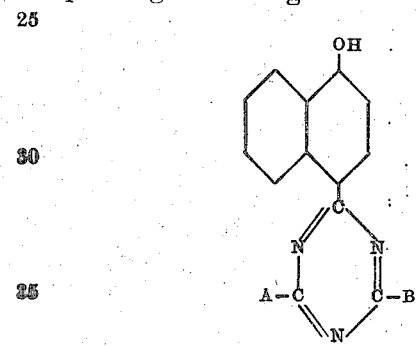

wherein A and B stand for aromatic residues of which one at the most is a 4-hydroxynaphthyl residue with unsulfonated diazo compounds on the fibre.

9. The herein described process for the manufacture of new dyestuffs by treating 2.4.6-derivatives of the 1.3.5-triazine corresponding with the general formula

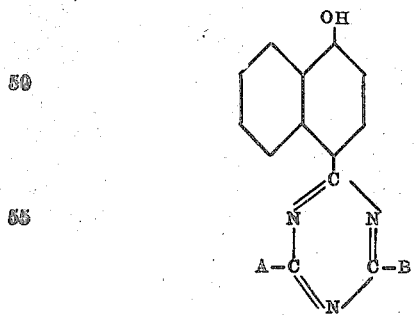

wherein A and B stand for aromatic residues of which one is a 4-hydroxynaphthalene residue and the other a hydroxyaryl residue with unsolfonated diazo compounds.

10. The herein described process for the manufacture of new dyestuffs by treating 2.4.6-derivatives of the 1.3.5-triazine corresponding with the general formula

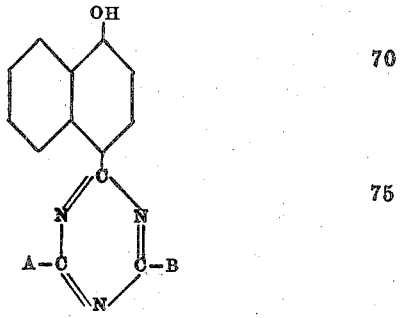

wherein A and B stand for aromatic residues of which one is a 4-hydroxynaphthalene residue and the other a hydroxyaryl residue with unsulfonated diazo compounds on the fibre.

11. The herein described process for the manufacture of new dyestuffs by treating 2.4.6-derivatives of the 1.3.5-triazine corresponding with the general formula

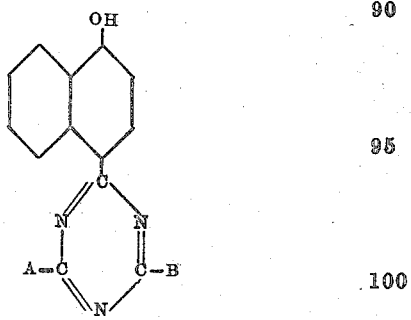

wherein A and B stand for aromatic residues of which one is a 4-hydroxynaphthyl and the other a hydroxyaryl residue with unsulfonated diazo compounds formed by two aromatic nuclei united by an azo bridge.

12. The herein described process for the manufacture of new dyestuffs by treating 2.4.6-derivatives of the 1.3.5-triazine corresponding with the general formula

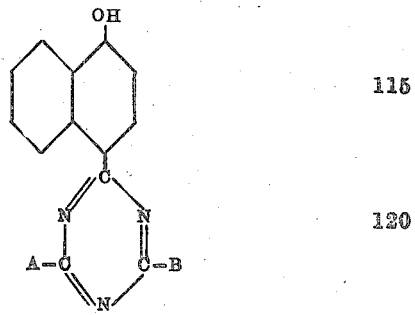

wherein A and B stand for aromatic residues of which one is a 4-hydroxynaphthyl and the other a hydroxyaryl residue with unsulfonated diazo compounds formed by two aromatic nuclei united by an azo bridge on the fibre.

13. As new products the above described azodyestuffs obtained by uniting 2.4.6-derivatives of the 1.3.5-triazine corresponding with the general formula

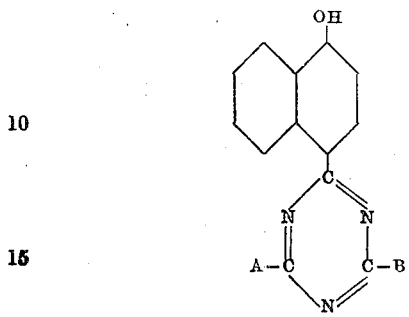

wherein A and B stand for any inorganic or organic residues, with unsulfonated diazo compounds, which dyestuffs form dark powders, insoluble in water, dissolving in sulfuric acid with bluish-red to violet-blue, in acetic acid or alcohol with orange, bluish-red and brown coloration, yielding when produced on the fibre yellowish-red to blue and black tints.

14. As new products the above described azodyestuffs obtained by uniting 2.4.6-derivatives of the 1.3.5-triazine corresponding with the general formula

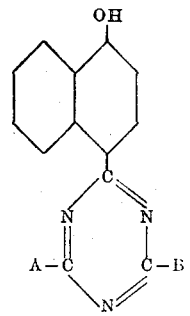

wherein A and B stand for organic residues, with unsulfonated diazo compounds, which dyestuffs form dark powders, insoluble in water, dissolving in sulfuric acid with bluish-red to violet-blue, in acetic acid or alcohol with orange, bluish-red and brown coloration, yielding when produced on the fibre yellowish-red to blue and black tints.

15. As new products the above described azodyestuffs obtained by uniting 2.4.6-derivatives of the 1.3.5-triazine corresponding with the general formula wherein A and B stand for organic residues, with unsulfonated diazo compounds, formed by two aromatic nuclei united by an azo bridge, which dyestuffs form dark powders, insoluble in water, dissolving in sulfuric acid with violet-blue, in acetic acid or alcohol with orange-brown to bluish-red coloration, yielding when produced on the fibre Bordeaux to blue and black tints.

16. Material dyed with the dyestuffs of claim 13.

17. Material dyed with the dyestuffs of claim 14.

18. Material dyed with the dyestuffs of claim 15.

In witness whereof I have hereunto signed my name this 16th day of March, 1925.

GÉRALD BONHÔTE.